US008825050B2

(12) United States Patent
Vujcic et al.

(10) Patent No.: US 8,825,050 B2
(45) Date of Patent: Sep. 2, 2014

(54) RANDOM ACCESS CHANNEL PREAMBLE DETECTION

(75) Inventors: Dragan Vujcic, Limours (FR); Patrick Fischer, Villepinte (FR)

(73) Assignee: LG Electronics Inc., Seoul (KR)

( * ) Notice: Subject to any disclaimer, the term of this patent is extended or adjusted under 35 U.S.C. 154(b) by 499 days.

(21) Appl. No.: 12/358,984

(22) Filed: Jan. 23, 2009

(65) Prior Publication Data

US 2009/0191875 A1    Jul. 30, 2009

Related U.S. Application Data

(60) Provisional application No. 61/023,196, filed on Jan. 24, 2008.

(51) Int. Cl.
| | | |
|---|---|---|
| H04W 36/00 | (2009.01) | |
| H04B 7/216 | (2006.01) | |
| H04W 4/00 | (2009.01) | |
| H04W 74/00 | (2009.01) | |
| H04W 74/08 | (2009.01) | |

(52) U.S. Cl.
CPC ........ *H04W 74/004* (2013.01); *H04W 74/0833* (2013.01); *H04W 74/0866* (2013.01)
USPC ............ 455/436; 370/335; 370/342; 370/329

(58) Field of Classification Search
USPC ....................................................... 455/436
See application file for complete search history.

(56) References Cited

U.S. PATENT DOCUMENTS

| | | | |
|---|---|---|---|
| 6,145,108 A * | 11/2000 | Ketseoglou | ................... 714/751 |
| 6,954,452 B2 | 10/2005 | Moulsley et al. | |
| 6,992,998 B1 | 1/2006 | Bhatoolaul et al. | |
| 7,433,334 B2 | 10/2008 | Marjelund et al. | |
| 7,701,961 B2 | 4/2010 | Lim et al. | |
| 8,014,359 B2 | 9/2011 | Cave et al. | |
| 2001/0017881 A1 | 8/2001 | Bhatoolaul et al. | |

(Continued)

FOREIGN PATENT DOCUMENTS

| | | |
|---|---|---|
| EP | 0994603 A2 | 4/2000 |
| KR | 10-2007-0065101 A | 6/2007 |
| KR | 10-2007-0081905 A | 8/2007 |
| WO | WO 2007/052972 A1 | 5/2007 |

OTHER PUBLICATIONS

Romain Masson, "E-UTRA RACH within the LTE system", Master's Degree Project, Sweden: Royal Institute of Technology (KTH), Feb. 3, 2006.

(Continued)

*Primary Examiner* — Lester Kincaid
*Assistant Examiner* — Andy Gu
(74) *Attorney, Agent, or Firm* — Birch, Stewart, Kolasch & Birch, LLP

(57) ABSTRACT

The present invention provides a method of and a network entity for processing a random access preamble. The network entity comprises a transceiver for receiving an random access preamble; and a processor for determining if the random access preamble is successfully detected, and for determining, in the case where the random access preamble is not successfully detected, if a combined preamble resulting from a combination of the random access preamble with a previous random access preamble received at the network entity prior to reception of the random access preamble and having an identical signature to the signature of the random access preamble, is successfully detected.

6 Claims, 11 Drawing Sheets

(56) References Cited

U.S. PATENT DOCUMENTS

| | | | | |
|---|---|---|---|---|
| 2001/0026547 | A1* | 10/2001 | Moulsley et al. | 370/347 |
| 2002/0049068 | A1* | 4/2002 | Koo et al. | 455/522 |
| 2002/0094832 | A1* | 7/2002 | Lee | 455/522 |
| 2002/0105929 | A1* | 8/2002 | Chen et al. | 370/335 |
| 2005/0235190 | A1* | 10/2005 | Miyazaki et al. | 714/748 |
| 2005/0276249 | A1* | 12/2005 | Damnjanovic et al. | 370/335 |
| 2006/0018289 | A1 | 1/2006 | Schulist et al. | |
| 2007/0064665 | A1 | 3/2007 | Zhang et al. | |
| 2007/0142070 | A1 | 6/2007 | Soldani et al. | |
| 2007/0189282 | A1* | 8/2007 | Lohr et al. | 370/370 |
| 2007/0191024 | A1* | 8/2007 | Kim et al. | 455/456.2 |
| 2007/0206531 | A1* | 9/2007 | Pajukoski et al. | 370/329 |
| 2008/0192766 | A1 | 8/2008 | Ranta-Aho et al. | |

OTHER PUBLICATIONS

Juan Reig et al., "Random access channel (RACH) parameters optimization in WCDMA systems.", In IEEE Vehicular Technology Conference—Fall, IEEE, Sep. 26-29, 2004, pp. 4296-4300.

M. Chuah et al., "Access Priority Scheme in UMTS MAC.", In: IEEE Wireless Communications and Networking Conference, IEEE, Sep. 21-24, 1999, pp. 781-786.

Yang Yang et al., "Analysis of Power Ramping Schemes for UTRA-FDD Random Access Channel.", IEEE Transactions on Wireless Communications, Nov. 2005, vol. 4, No. 6, pp. 2688-2693.

* cited by examiner

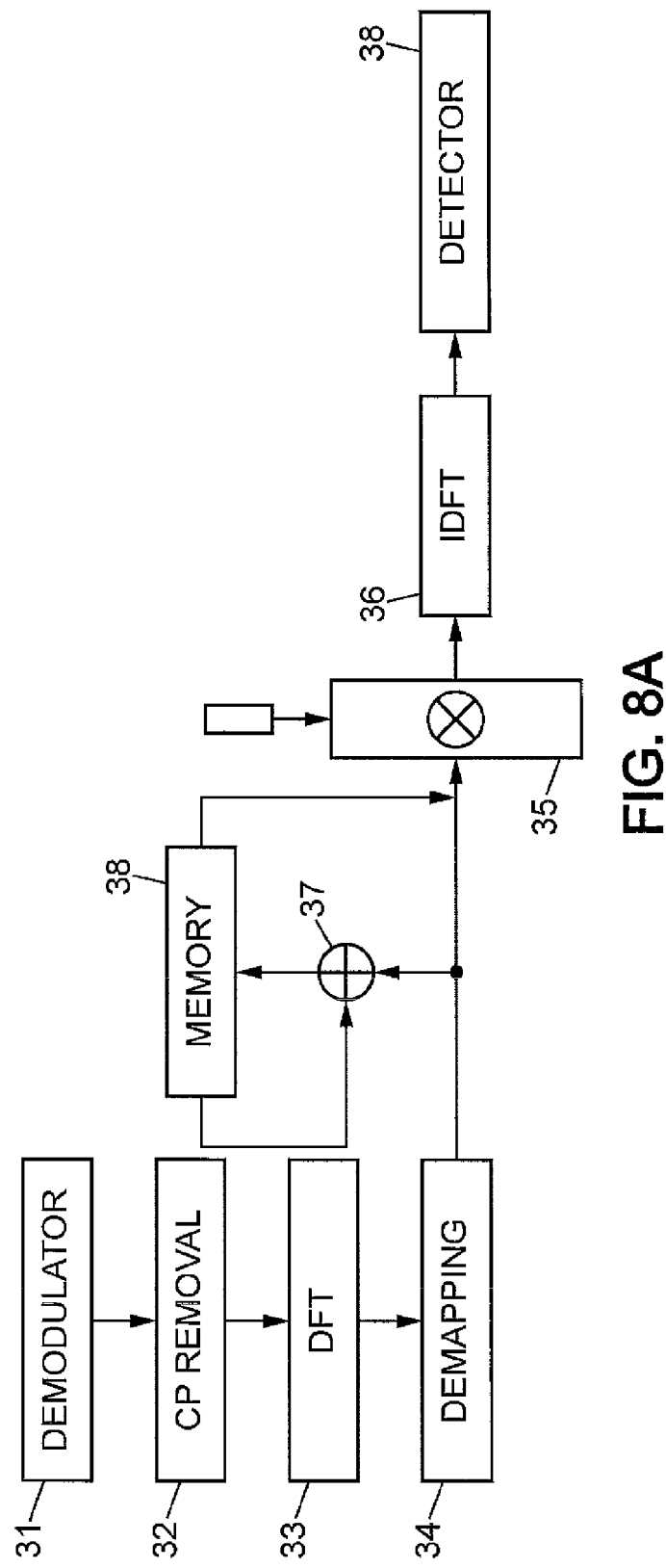

RANDOM ACCESS CHANNEL PREAMBLE DETECTION

This application claims priority of U.S. Provisional Application No. 61/023,196 filed on 24 Jan. 2008, the content of which is incorporated herein by reference.

BACKGROUND OF THE INVENTION

1. Field of the Invention

The present invention relates to random access channel (RACH) procedure in a cellular communications network, and in particular to a method and apparatus for detecting a RACH preamble signal. While it is described below in the context of a long term evolution (LTE) type cellular network for illustrative purposes and since it happens to be well suited to that context, those skilled in the art will recognise that the invention disclosed herein can also be applied to various other types of cellular networks.

2. Discussion of the Related Art

A universal mobile telecommunications system (UMTS) is a 3rd Generation (3G) asynchronous mobile communication system operating in Wideband Code Division Multiple Access (WCDMA) based on a European standard known as Global System for Mobile Communications (GSM), and general packet radio services (GPRS) The LTE of UMTS is under discussion by the 3rd generation partnership project (3GPP) that standardised UMTS.

3GPP LTE is a technology for enabling high-speed packet communications. Many schemes have been proposed for the LTE objective including those that aim to reduce user and provider costs, improve service quality, and expand and improve coverage and system capacity. 3G LTE requires reduced cost per bit, increased service availability, flexible use of a frequency band, a simple structure, an open interface, and adequate power consumption of a terminal as an upper-level requirement.

FIG. 1 is a block diagram illustrating a network structure of an evolved universal mobile telecommunication system (E-UMTS). The E-UMTS may be also referred to as an LTE system. The communication network is widely deployed to provide a variety of communication services such as voice and packet data.

As illustrated in FIG. 1, the E-UMTS network includes an evolved UMTS terrestrial radio access network (E-UTRAN) and an evolved packet core (EPC) and one or more user equipments (UEs) 101. The E-UTRAN may include one or more evolved NodeBs (eNodeB, or eNB) 103, and a plurality of UEs 101 may be located in one cell. One or more E-UTRAN mobility management entity (MME)/system architecture evolution (SAE) gateways 105 may be positioned at the end of the network and connected to an external network.

As used herein, "downlink" refers to communication from an eNodeB 103 to a UE 101, and "uplink" refers to communication from the UE 101 to an eNodeB 103. UE 101 refers to communication equipment carried by a user and may be also be referred to as a mobile station (MS), a user terminal (UT), a subscriber station (SS) or a wireless device.

An eNodeB 103 provides end points of a user plane and a control plane to the UE 101. MME/SAE gateway 105 provides an end point of a session and mobility management function for UE 101. The eNodeB 103 and the MME/SAE gateway 105 may be connected via an S1 interface.

The eNodeB 103 is generally a fixed station that communicates with a UE 101, and may also be referred to as a base station (IBS), a network entity or an access point. One eNodeB 103 may be deployed per cell. An interface for transmitting user traffic or control traffic may be used between eNodeBs 103.

The MME provides various functions including distribution of paging messages to eNodeBs 103, security control, idle state mobility control, SAE bearer control, and ciphering and integrity protection of non-access stratum (NAS) signalling. The SAE gateway host provides assorted functions including termination of U-plane packets for paging reasons, and switching of the U-plane to support UE mobility. For clarity, MME/SAE gateway 105 will be referred to herein simply as a "gateway," but it is understood that this entity includes both an MME and an SAE gateway.

A plurality of nodes may be connected between the eNodeB 103 and the gateway 105 via the S1 interface. The eNodeBs 103 may be connected to each other via an X2 interface and neighbouring eNodeBs may have a meshed network structure that has the X2 interface.

FIG. 2(a) is a block diagram depicting an architecture of a typical E-UTRAN and a typical EPC. As illustrated, eNodeB 103 may perform functions of selection for gateway 105, routing toward the gateway during a radio resource control (RRC) activation, scheduling and transmitting of paging messages, scheduling and transmitting of broadcast channel (BCCH) information, dynamic allocation of resources to UEs 101 in both uplink and downlink, configuration and provisioning of eNodeB measurements, radio bearer control, radio admission control (RAC), and connection mobility control in LTE_ACTIVE state. In the EPC, and as noted above, gateway 105 may perform functions of paging origination, LTE-IDLE state management, ciphering of the user plane, system architecture evolution (SAE) bearer control, and ciphering and integrity protection of non-access stratum (NAS) signalling.

FIGS. 2(b) and 2(c) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well-known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 2(b) and 2(c) is depicted because if the RLC functions are implemented in and performed by the MAC layer, the RLC layer itself is not required. The packet data convergence protocol (PDCP) layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN.

As illustrated in FIG. 2(b), the RLC and MAC layers (terminated in an eNodeB 103 on the network side) may perform functions such as scheduling, automatic repeat request (ARQ), and hybrid automatic repeat request (HARQ). The PDCP layer (terminated in eNodeB 103 on the network side) may perform the user plane functions such as header compression, integrity protection, and ciphering.

As illustrated in FIG. 2(c), the RLC and MAC layers (terminated in an eNodeB 103 on the network side) perform the same functions as for the control plane. As illustrated, the RRC layer (terminated in an eNodeB 103 on the network side) may perform functions such as broadcasting, paging, RRC connection management, RB control, mobility functions, and UE measurement reporting and controlling. The NAS control protocol (terminated in the MME of gateway 105 on the network side) may perform functions such as an SAE bearer management, authentication, LTE_IDLE mobility handling, paging origination in LTE_IDLE, and security control for the signalling between the gateway and UE 101.

The NAS control protocol may use three different states; first, a LTE_DETACHED state if there is no RRC entity; second, a LTE_IDLE state if there is no RRC connection while storing minimal UE information; and third, an LTE_ACTIVE state if the RRC connection is established. Also, the RRC state may be divided into two different states such as a RRC_IDLE and a RRC_CONNECTED.

In RRC_IDLE state, the UE 101 may receive broadcasts of system information and paging information while the UE 101 specifies a discontinuous reception (DRX) configured by NAS, and the UE has been allocated an identification (ID) which uniquely identifies the UE in a tracking area. Also, in RRC-IDLE state, no RRC context is stored in the eNodeB 103.

In RRC_CONNECTED state, the UE 101 has an E-UTRAN RRC connection and a context in the E-UTRAN, such that transmitting and/or receiving data to/from the network (eNodeB) becomes possible. Also, the UE 101 can report channel quality information and feedback information to the eNodeB 103.

In RRC_CONNECTED state, the E-UTRAN knows the cell to which the UE 101 belongs. Therefore, the network can transmit and/or receive data to/from the UE 101, the network can control mobility (handover) of the UE 101, and the network can perform cell measurements for a neighbouring cell.

In RRC_IDLE mode, the UE 101 specifies the paging discontinuous reception (DRX) cycle. Specifically, the UE 101 monitors a paging signal at a specific paging occasion of every UE specific paging DRX cycle.

The procedure where a UE sends a first message to a network is commonly referred to as initial access. In most systems the initial access is initiated by a UE transmitting a connection request message including the reason of the request, and receiving an answer from the network indicating the allocation of radio resources for the requested reason.

In 3GPP TS 25.331 there are several reasons, referred to as establishment causes, for sending a connection request message. Establishment causes include: originating conversational/streaming/interactive/background/subscribed traffic call, terminating conversational/streaming/interactive/background call, emergency call, inter radio access technology (RAT) cell re-selection, inter-RAT cell change order, registration, detach, originating high/low priority signalling, call re-establishment and terminating high/low priority signalling.

An "originating call" establishment indicates that the UE 101 wishes to setup a connection, for instance a speech connection. A "terminating call" establishment indicates that the UE 101 answers to paging. A "registration" establishment indicates that the user wants to register only to the network.

To initiate access to the network a random access procedure is used. The physical random access transmission is under the control of higher layer protocol which performs some important functions related to priority and load control. These procedures differ in detail but GSM, UMTS and LTE radio systems have some similarities between them.

In the random access procedure the UE 101 randomly selects an access resource and transmits a RACH preamble to the network. A preamble is a short signal that is sent before the transmission of the RACH connection request message. The UE 101 can repeatedly transmit the preamble by increasing the transmission power each time the preamble is sent until the network indicates the detection of the preamble. Then the message part is sent at the level of power equal to the last preamble transmission power plus an offset signalled by the network.

A random access channel (RACH) is a common physical channel dedicated to the random access procedure. Uplink transmissions are generally initiated through a RACH. A UE sending data on a RACH has not yet been identified by the target eNB. RACH is typically a common uplink common channel used for transmitting control information and user data and can be sued for low data transmission from the higher layer. Such a channel is said to be contention-based since many users can attempt to access the same base station simultaneously, leading to collisions. A RACH channel can be used for several purposes. For example the RACH can be used to access the network, to request resources, to carry control information, to adjust the time offset of the uplink in order to obtain uplink synchronisation, to adjust the transmitted power, etc.

A random access procedure can be launched by the UE or the eNodeB. It may, for instance, be triggered by the following events:

a UE switches from power-off to power-on and needs to be registered to the network.
 a UE is not time-synchronized with a eNodeB and starts transmitting data (for instance the user calls).
 a eNodeB starts transmitting data to the UE but they are not synchronized (for instance the user receives a call).
 a eNodeB measures a delay of the received signal from the UE (for instance the user is moving and has lost synchronization).
 a UE is moving from one cell to another and needs to be time-synchronized with a different target eNodeB than the serving eNodeB it is registered to (handover).

FIG. 3 illustrates the sequences of messages and responses exchanged between a user equipment UE 101 and a base station eNB 103 in a typical RACH procedure.

Firstly the UE 101 retrieves information transmitted periodically from eNB 103 on a downlink broadcast channel (BCH) and selects a preamble signature, a RACH time slot and a frequency band. The preamble signature is chosen by the UE 101 from among a set of signatures known by the eNB 103. The UE 101 generates a single random access burst containing the chosen signature and transmits it to the eNB 103 over the selected time slot at the selected frequency in message 1.

The random access burst consists of a cyclic prefix, a preamble, and a guard time during which nothing is transmitted as illustrated in FIG. 4. OP denotes cyclic prefix, GT denotes guard time, RTD denotes round trip delay and TTI denotes transmission time interval.

The preamble is sent before a RACH connection request and indicates that the UE is about to transmit data. The random access burst is transmitted during one subframe. While the UE is not synchronized in the time domain, its random access burst may overlap with the next subframe and generate interference. A guard time may thus be added to combat interference. The guard time (GT) should be at least equal to the round-trip delay at the cell edge.

During the random access procedure, several users share the same channel. In order to address contention issues they are distinguishable by virtue of orthogonal sequences. These sequences are seen as the UE preamble signatures that can be transmitted simultaneously by a number of UEs. A collision occurs whenever several users choose the same signature and send it within the same time and frequency resources.

The eNB 103 monitors the current RACH slot in an attempt to detect preambles transmitted from UEs in the corresponding cell.

On reception of a signal the eNB 103 correlates the received signal in the RACH sub-frame with all possible signatures. Detection of the preamble can be either performed in the time domain or in the frequency domain. A detection variable is computed for each signature. If the detection variable exceeds a certain threshold, the preamble is considered detected.

The eNB 103 sends a random access response to acknowledge the successfully detected preambles in message 2. This message is sent on a dedicated downlink channel and uses the detected signature. It contains a timing advance command, a power-control command. If the procedure is contention-free then the UE and the eNodeB are thereby aligned in the time domain.

If the UE 101 receives a response from the eNB 103 the UE 101 decodes the response and adapts its transmission timing, and its transmission power if the response contains power control information. The UE 101 then sends a resource request message—message 3—on a dedicated uplink channel. In this message, the UE requests bandwidth and time resources to transmit data and it also indicates a UE-specific identifier. If the UE requests resources, the UE 101 uses a specific ID in the message to resolve contentions. Then the UE monitors a specified downlink channel for response from the eNB. In the case of a positive resource grant, the subsequent transmissions are carried out as normal.

The eNB attempts to resolve any contentions. If the eNB 103 receives a resource request with a UE-specific ID or signature the eNB 103 checks how many UEs were detected with the same signature and resolves any possible contentions. If the preamble sent by UE 101 was in collision with a preamble from another UE, the eNB 103 sends a contention resolution message—message 4—to give the command to UE 101 to re-start the RACH procedure. If on the other hand the UE 101 was not in collision, the eNB sends a resource assignment message—message 5. In this case the subsequent transmissions are carried out as usual. The eNB 103 identifies the UE 101 and assigns resources according to the scheduling rules applied.

In the random access response, message 2, the UE may receive an ACK signal from the eNB to indicate that a message can be sent, a NACK signal indicating that the preamble was detected but a message cannot to be sent, or no response indicating that the preamble was not detected.

In the case where UE 101 receives no response indicating that a preamble has not been detected at the first attempt, the UE 101 waits for the next RACH slot to send another preamble. The preamble signal-to-noise ratio (SNR) is relatively low compared to data SNR owing to the length of the zero-correlation sequences. Given that the random access channel does not generate much interference, the UE can afford to increase the transmission power by a few decibels (dB) at the second attempt to prevent consecutive failures (power ramping method). A too long delay is not desirable, especially in the case of handovers. The UE 101 repeatedly transmits the preamble by increasing the transmission power every time the preamble is sent until the network indicates the detection of the preamble. The procedure is exited after a certain number of failures. If a preamble is successfully transmitted the message part is generally sent at the level of power equal to the last preamble transmission power plus an offset signaled by the network.

One reason why a preamble may not be detected on a first attempt may be severe channel attenuation. If the next RACH slot occupies the same position in frequency domain then the channel is likely to fade again and the preamble undetected. Frequency hopping for RACH has been introduced to increase the detection performance of preamble retransmission by means of frequency diversity. A drawback of frequency hopping is that it requires more overhead in broadcast information and may introduce delay in the case of handovers.

A particular drawback of frequency hopping is that it can not be performed within a 1.4 MHz bandwidth since the size of the transmission bandwidth configuration (6 RBs) is the same as the PRACH transmission size.

A further drawback arises in the case of a handover (HO) with a 20 ms RACH period. When a UE performs a HO from a serving cell to a target cell it needs to know which RACH frequency to use. A prior art solution proposes that the frequency hopping pattern is based on SFN (System Frame Number). By knowing the SFN the UE can then determine which frequency is reserved for random access. There are different possibilities for an UE to obtain the SFN of the target cell:

The SFN of the target cell may be obtained through dedicated signaling (a handover command message) by the serving cell. This assumes some information exchange between eNBs, in order to match the SFN of the serving cell with the beginning of the frequency hopping pattern (frequency hopping period) in the target cell. Knowing the SFN an UE would be able to derive the frequency for RACH transmission in a target cell based on the SFN of serving cell from which it performs HO. This solution does not require knowing which radio frames allow RACH in the target cell in the case of a 20 ms random access period. Signaling overhead and lack of SFN accuracy in unsynchronised networks are however the main drawbacks of this approach.

The SFN of the target cell may be obtained by decoding the P-BCH (Physical Broadcast Channel) from the target cell. However the 40 ms P-BCH TTI (Physical Broadcast Channel transmission time interval) can lead to unacceptable HO interruption time.

An object of the present invention is to provide an alternative method of increasing the probability of detection of a RACH preamble and to thereby improve the RACH procedure.

SUMMARY OF THE INVENTION

According to a first aspect of the present invention there is provided a network entity for processing a random access preamble, the network entity comprising: a transceiver for receiving an random access preamble; and a processor for determining if the random access preamble is successfully detected, and for determining, in the case where the random access preamble is not successfully detected, if a combined preamble resulting from a combination of the random access preamble with a previous random access preamble received at the network entity prior to reception of the random access preamble and having an identical signature to the signature of the random access preamble, is successfully detected.

By combining the received preamble energy of a current RACH preamble with a previously received RACH preamble having the same preamble signature, the probability of RACH preamble detection is increased without the need to change the frequency at each RACH transmission. Combining the preambles in this way improves RACH performances because the addition leads to constructive interference of the noise samples while the signal samples are added. The signal to noise ratio is therefore higher. Moreover, the procedure simplifies a HO procedure since there is no need to read the SFN in order to determine at which frequency a preamble should be transmitted According to a second aspect of the present invention there is provided a user equipment for transmitting a random access preamble to a network entity, the user equipment comprising: a transceiver for transmitting a random access preamble; and a processor for determining if the random access preamble is successfully detected at the network entity, the processor being operable to allocate a signature to a retransmission random access preamble in the case where the random access preamble is not successfully detected wherein the signatures of the random access preamble and the retransmission random access preamble are identical.

According to a third aspect of the present invention there is provided a method of receiving a random access preamble from a user equipment, the method comprising: receiving at a network entity, a random access preamble including a signature; determining if the random access preamble is successfully detected; and in the case where the random access preamble is not successfully detected, determining if a combined preamble, resulting from a combination of the random access preamble with a previous random access preamble having an identical signature to the signature of the random access preamble and received at the network entity prior to reception of the random access preamble, is successfully detected.

According to a fourth aspect of the present invention there is provided a method of operating a user equipment for transmitting a random access preamble, the method comprising: transmitting a random access preamble to a network entity; determining if the random access preamble has been successfully detected at the network entity, and if the random access preamble is not successfully received, at the network entity; and transmitting a retransmission random access preamble to the network entity wherein the random access preamble and the retransmission random access preamble include identical signatures.

The methods according to the invention may be computer implemented. The methods may be implemented in software on a programmable apparatus. They may also be implemented solely in hardware or in software, or in a combination thereof.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION THE DRAWINGS

Embodiments of the invention will now be described, by way of example only, and with reference to the following drawings in which:—

FIG. 1 is a block diagram illustrating network structure of an E-UMTS (or LTE) system.

FIGS. 2(a), 2(b) and 2(c) are block diagrams depicting logic architecture of typical network entities of the LTE system (FIG. 2(a)), a user-plane (U-plane) protocol stack (FIG. 2(b)) and a control-plane (C-plane) protocol stack (FIG. 2(c)).

FIG. 3 schematically illustrates a RACH preamble structure in E-UMTS

Figure 6:
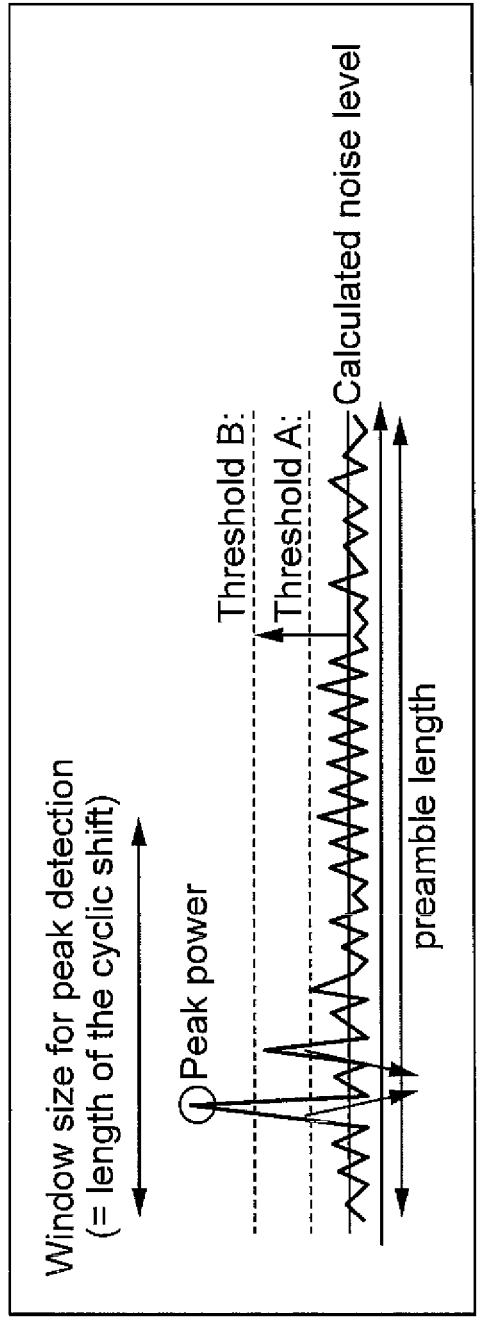

FIG. 6 schematically illustrates comparison of a the power level of a preamble signal with a successful detection threshold and a combining detection threshold, according to at least one embodiment of the invention.

Figure 7A:
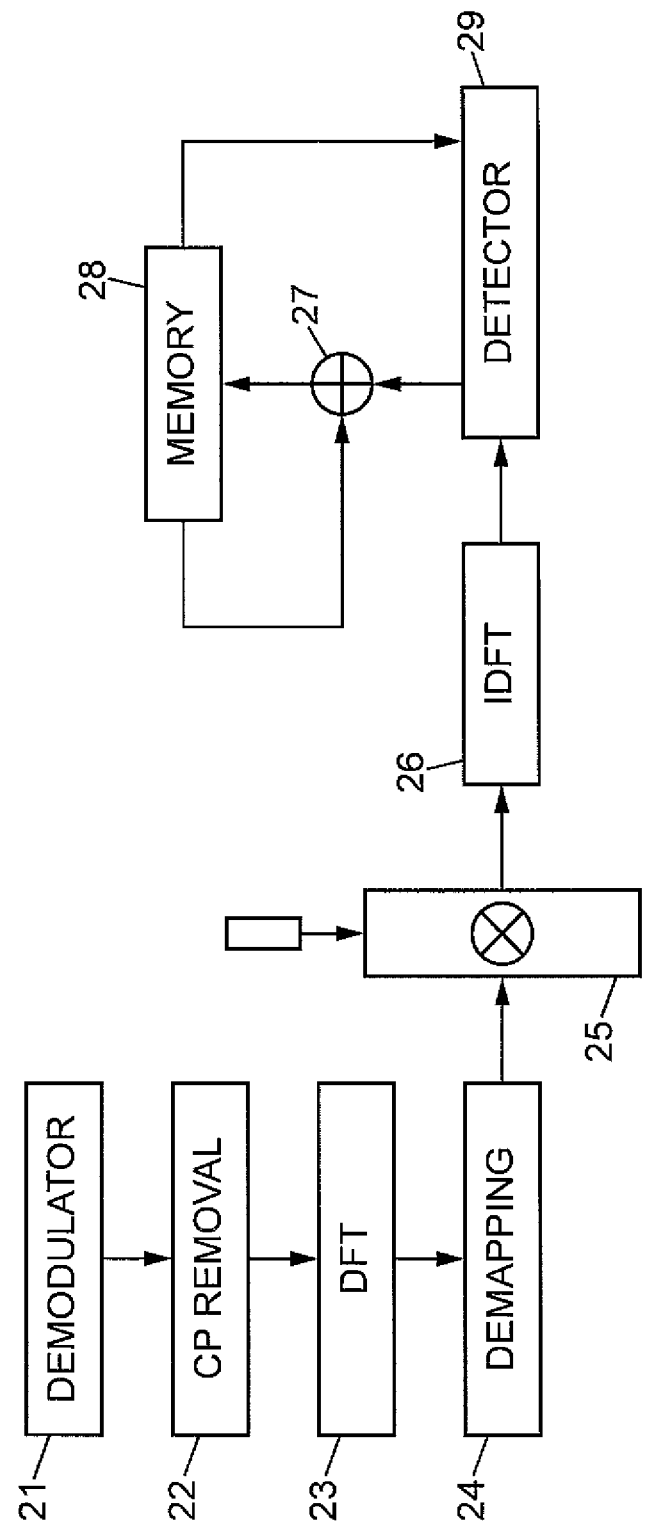
Figure 7B:
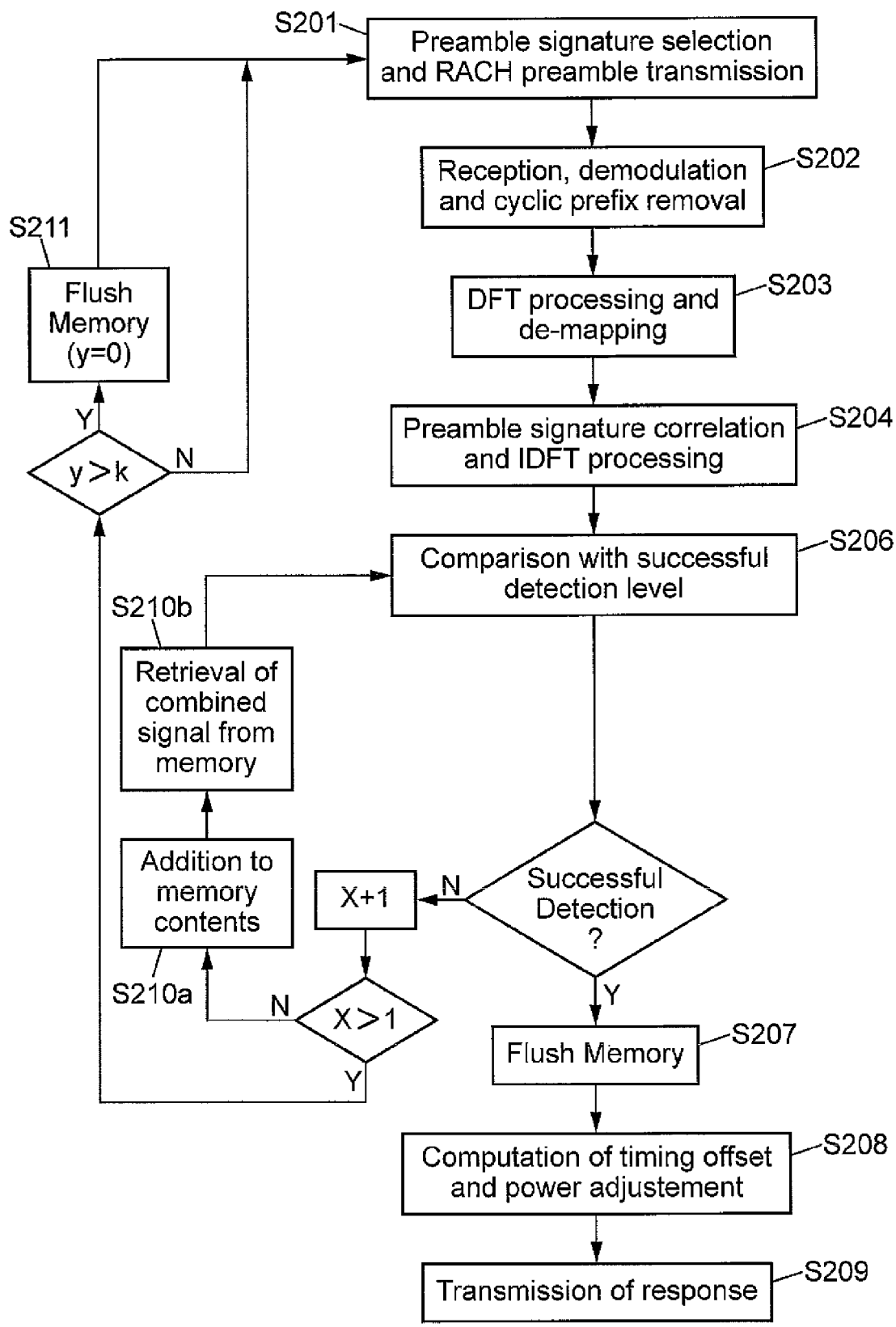

FIG. 7A is a block diagram illustrating the functional modules of a RACH preamble receiver according to a second embodiment of the present invention FIG. 7B is a flow chart illustrating a method of random access preamble selection according to the second embodiment of the present invention.

Figure 8B:
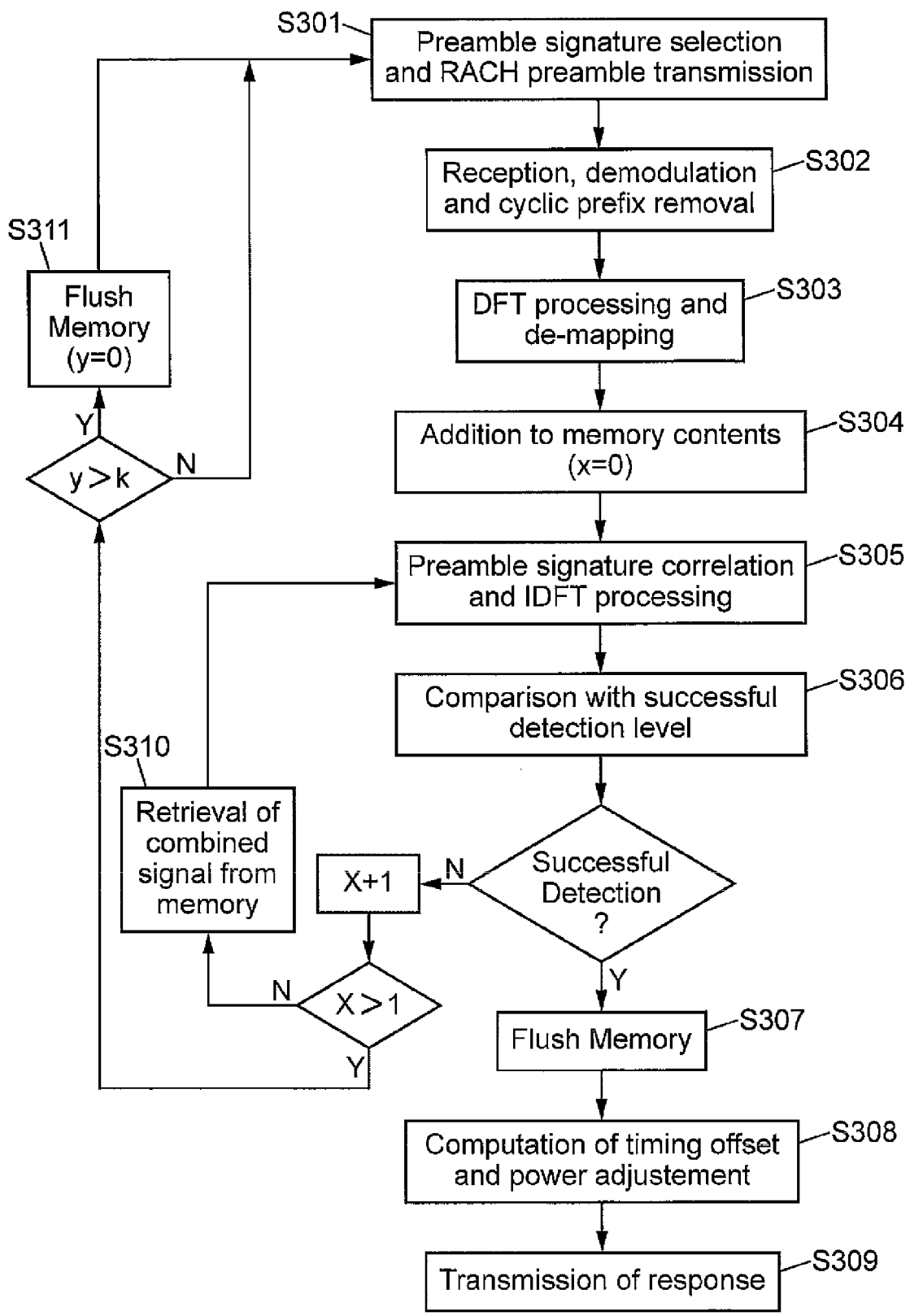

FIG. 8A is a block diagram illustrating the functional modules of a RACH preamble receiver according to a third embodiment of the present invention FIG. 8B is a flow chart illustrating a method of random access preamble selection according to the third embodiment of the present invention.

DESCRIPTION OF PREFERRED EMBODIMENTS

Reference will now be made in detail to embodiments of the present invention, examples of which are illustrated in the accompanying drawings.

Embodiments of the present invention are directed to a RACH initial access procedure between a UE and a network entity constituted of an eNodeB and in particular to the procedure of detection of a preamble signal at the eNodeB.

Figure 5A:
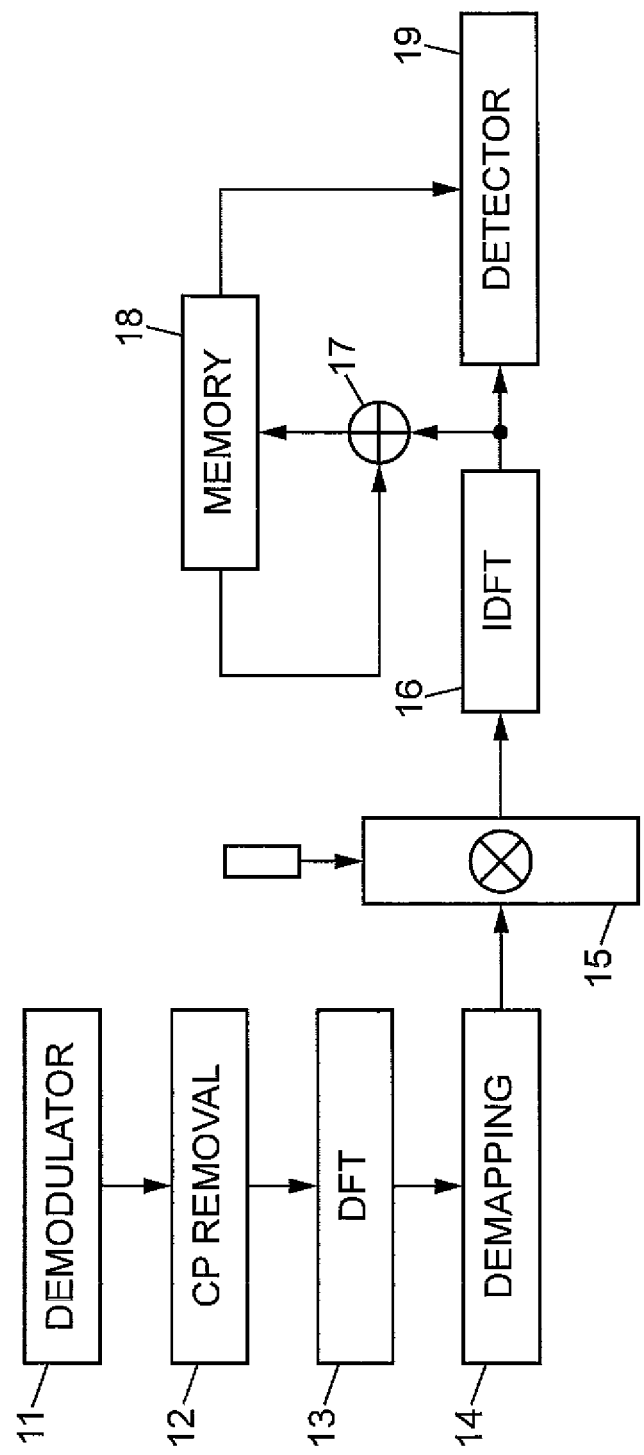
FIG. 5A is a block diagram illustrating the functional modules of a RACH preamble receiver according to a first embodiment of the present invention

The functional modules of a RACH preamble detection receiver of a base station eNodeB 103 according to a first embodiment of the invention are illustrated in FIG. 5A. The RACH preamble detection receiver 10 comprises a demodulation module 11, a cyclic prefix removal module 12, a DFT (discrete Fourier Transform) processing module 13, a demapping module 14, a RACH correlation module 15, an IDFT (Inverse Discrete Fourier Transform) processing module 16, an adder 17, a memory 18 and a detection module 19.

Figure 5B:
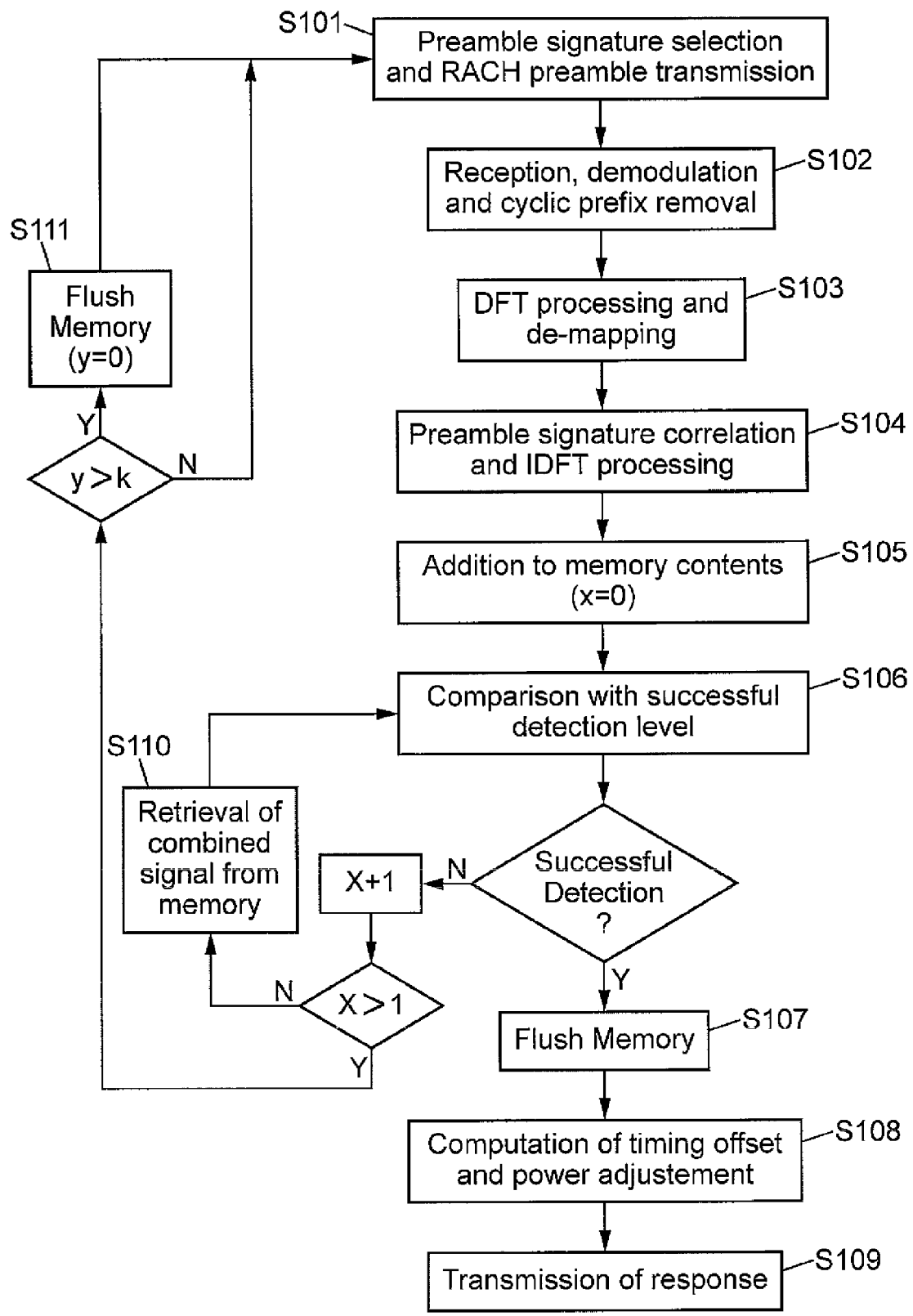
FIG. 5B is a flow chart illustrating a method of random access preamble selection according to the first embodiment of the present invention.

FIG. 5B illustrates a random access procedure in LTE according to the first embodiment of the present invention. A random access procedure between a user equipment UE 101 and a base station eNodeB 103 is initiated by UE 101 after UE 101 has received transmission information transmitted periodically from eNodeB 103 on a downlink broadcast channel. Such information includes available preamble signatures in the cell frequency location and period of available RACH slots, target power etc. In step S101 UE 101 sets its transmission power according to the signal attenuation measured in the downlink channel. Open-loop power control can be used to obtain a suitable transmission power. The UE 101 estimates path loss from a downlink reference signal and sets the transmission power to achieve a signal-to-noise ratio (SNR) target indicated by the eNB 103. The eNB 103 may fix the targeted SNR upon the measured level of interference in the uplink channel. The shadowing in the uplink path may differ from the shadowing in the downlink path because the carrier frequency has changed.

In step S101 UE 101 selects a preamble signature—preamble signature A, a RACH time slot and a frequency band. The preamble signature is chosen by the UE 101 from among a set of signatures known by the eNodeB 103. Preamble signatures should portray good autocorrelation properties in order for the eNodeB 103 to obtain an accurate timing estimation for a single preamble; and good cross correlation properties in order for the eNodeB 103 to obtain an accurate timing estimation for different preambles transmitted simultaneously by different UEs.

In 3GPP LTE, RAN1 Zadoff-Chu (ZC) sequences may be used to fulfil these requirements. These sequences are seen as UE signatures. Each cell possesses a set of signatures obtained from Zadoff-Chu sequences. For example a cell may have 64 preamble sequences with the length of one sequence being generally N=839 samples. A ZC sequence is defined by two integers: u is the root index and v is the cyclic shift index.

In the time domain, the v-th cyclic shift is extracted from the u-th root with the expression:

$$x_{u,v}(n) = x_u(n + v \cdot N_{CS}) \; n = 0 \ldots N-1$$

where $N_{CS}$ is the cyclic shift length. The u-th root sequence in the frequency domain is given by:

$$x_u(n) = e^{j\pi \cdot u \cdot \frac{n(n+1)}{N}}$$

The ZC sequences can be used because they are able to generate a large number of sequences and they offer interesting correlation properties: the autocorrelation function shows no side peaks. The cross correlation between two sequences obtained from different roots is given by $\sqrt{N}$. Thus ZC sequences have zero-cross-correlation zones.

UE 101 transmits to the eNodeB 103 a random access burst including the preamble signal containing preamble signature A over the selected time slot at the selected frequency.

On reception of the random access burst from the UE 101, in step S102 the random access burst is demodulated in demodulation module 11. The cyclic prefix (CP) is removed from the received random access burst signal by CP removal module 12. In step S103 the preamble signal then undergoes a discrete Fourier transform (DFT) in the frequency domain and a demapping process.

In step S104, the correlation module 15 of eNode B 103 correlates the received preamble signal with all the possible signatures in step S104. The time domain RACH correlation sequence is then obtained from the frequency domain RACH spectrum correlation output through IDFT processing in IDFT processing module 16.

It will be appreciated, that in embodiments of the invention, detection may be performed in the time domain or in the frequency domain In the first embodiment of the invention as illustrated in FIG. 5B, prior to detection, in step S105, the preamble signal is added to a preamble signal stored in a memory 18 having the same preamble signature A. In step S106 the power level of the received preamble signal is compared with a successful detection threshold in detection module 19 as illustrated in FIG. 6. If the power level of the preamble signal exceeds a successful detection threshold, Threshold B, then it is considered that the preamble signal is successfully detected and the memory 18 containing the combined preamble signal is flushed in step S107. The eNodeB 103 proceeds according to the conventional RACH procedure. In step S108 a timing offset can be computed from the peak position of the preamble signal as illustrated in FIG. 6 and a power adjustment can be estimated from the values of the detection values. The eNodeB 103 then sends an acknowledgement random access response to the UE 101 in step S109 using the detected preamble signature A indicating timing advance and any power adjustment.

If, however, in step S106 the power level of the preamble signal does not exceed the successful detection threshold level but exceeds a lower combining acceptance threshold level, Threshold A, the contents of the memory 18 are retrieved in step S110. If the memory contains a combined preamble signal of the unsuccessfully detected preamble signal and a previous unsuccessfully detected preamble signal having the same preamble signature and received in a previous RACH slot, then the power level of the combined preamble signal is compared with the successful detection level. If the power level of the combined preamble signal exceeds the successful detection level the memory 18 is flushed in step S107 and the eNodeB 103 proceeds according to the conventional RACH procedure. In step S108 a timing offset can be computed from the peak position of the preamble signal and a power adjustment can be estimated from the values of the detection values. The eNodeB 103 then sends an acknowledgement random access response to the UE 101 in step S109 using the detected preamble signature A indicating timing advance and power adjustment.

If the user equipment UE 101 does not receive a response from the eNodeB 103 the UE 101 generates a second random access burst signal and allocates the same preamble signature—preamble signature A as the previous unsuccessfully detected first Random access burst signal to the second random access burst signal. The second preamble random access burst signal is transmitted to the eNB 103 at an increased power level in step S101.

On reception of the second preamble access burst signal at the eNodeB 103 the second random access burst signal undergoes steps S102 to S104 of demodulation, CP removal, DFT processing, demapping, correlation and IDFT processing. In step S105 the second preamble signal is then added to the first preamble signal in the memory 18 since the first preamble signal and the second preamble signal have the same preamble signature—preamble signature A. In step S106 the power level of the second preamble signal is compared with the successful detection threshold level. If the power level of the second preamble signal exceeds the successful detection threshold level then the memory 18 is flushed in step S107 and the eNB 103 sends an ACK signal to the UE 101 in step S109.

If the power level of the second preamble signal does not reach the successful detection level but does exceed the combining detection threshold level then the combined preamble signal of the first preamble signal and the second preamble signal having the same preamble signature—signature A is retrieved from memory 18 and the power level of the combined preamble signal is compared with the successful detection level in step S106. If the power level of the combined preamble signal exceeds the successful detection threshold level then the memory 18 is flushed in step 107 and the eNB 103 sends an ACK random access response signal to the UE 101 in step 109.

If detection of the combined signal is unsuccessful the eNB 103 sends no response to the UE101 and monitors for further incoming RACH burst signals. A preamble signal having a particular signature can be added to preamble signals in the memory having the sample particular signature up to a predetermined total number of signals. The memory 18 can be flushed of a combined preamble signal having a particular signature after a predetermined number of successive preamble signals having that particular signature have been received and unsuccessfully detected. Alternatively the memory can be flushed of a combined or initial preamble signal having a particular signature after a predetermined time period following unsuccessful detection of the first preamble signal having that particular signature.

In the flow chart of FIG. 5A, for illustrative purposes, count X is used to ensure the same combined signal is not retrieved more than once for successful threshold comparison. If X exceeds 1, the detection module awaits a new preamble signal to be added to the memory before retrieving a combined signal and X is reset to 0. Count Y corresponds to the number of successive preamble signals having a particular signature that have been received and unsuccessfully detected. Each time a preamble signal is added to a preamble signal or a combined preamble signal having the same signature in the memory, Y is incremented. Y is reset when it exceeds threshold K and the memory is flushed. It will be appreciated that alternative suitable counting or timing methods may be used.

Figure 1:
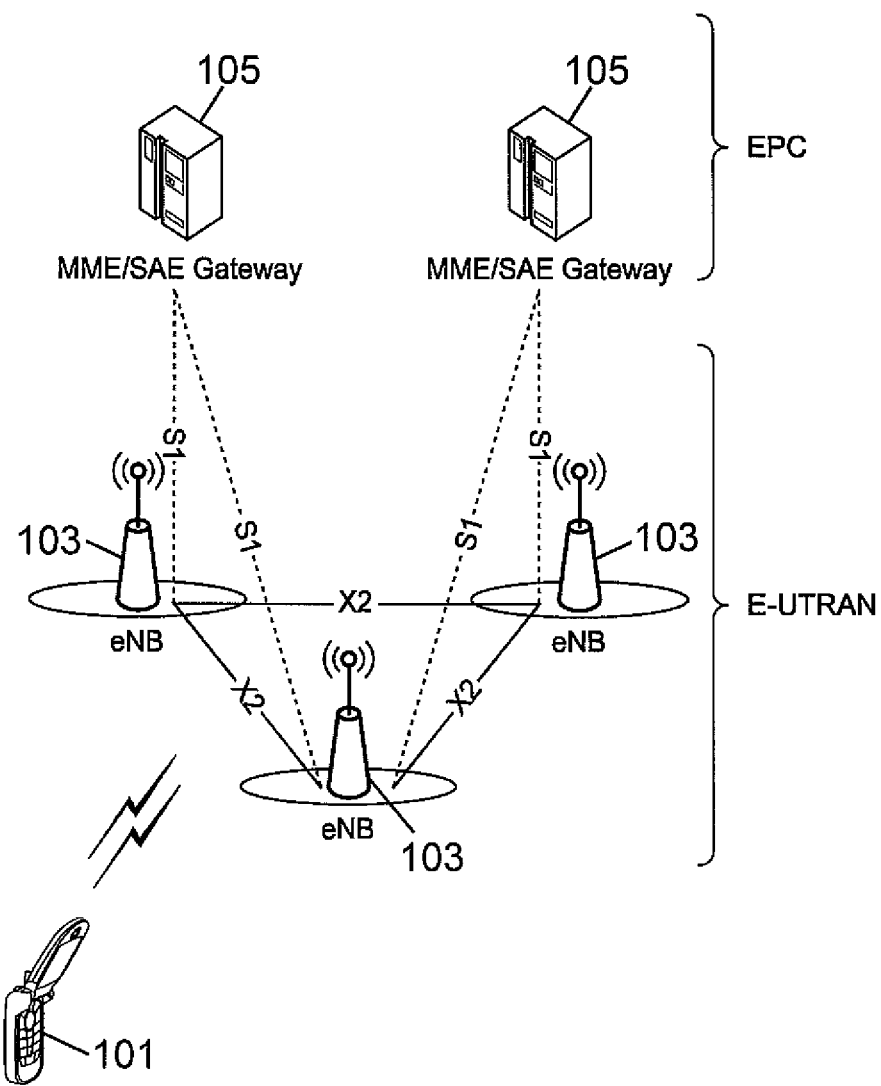
Figure 2A:
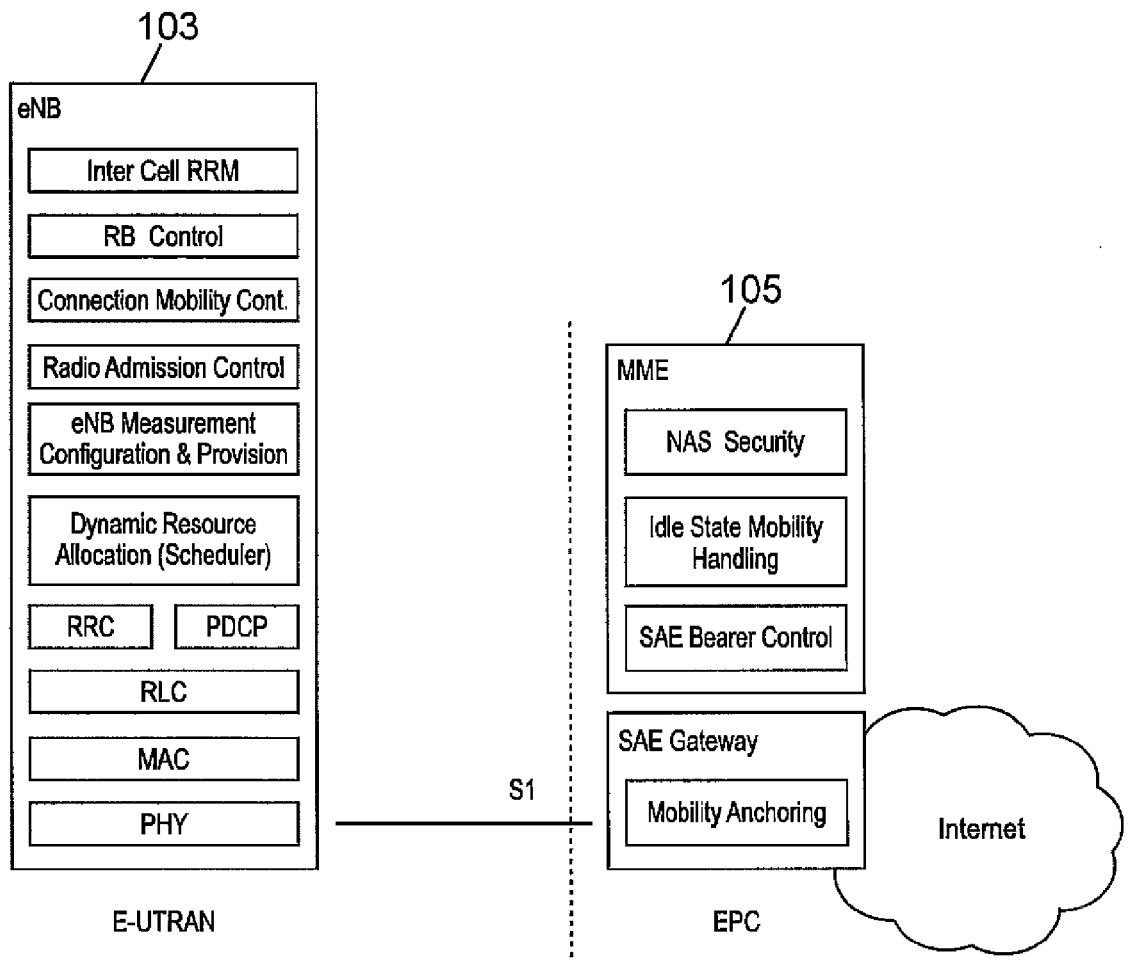
Figure 2B:
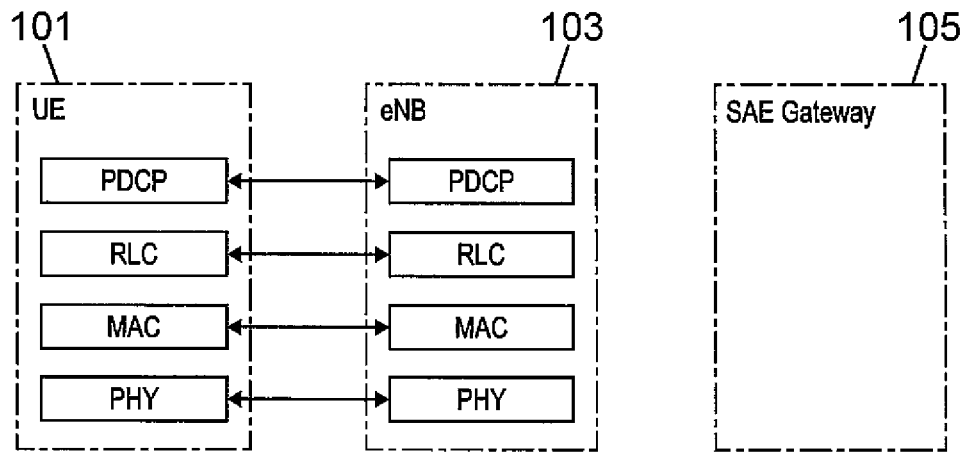
Figure 2C:
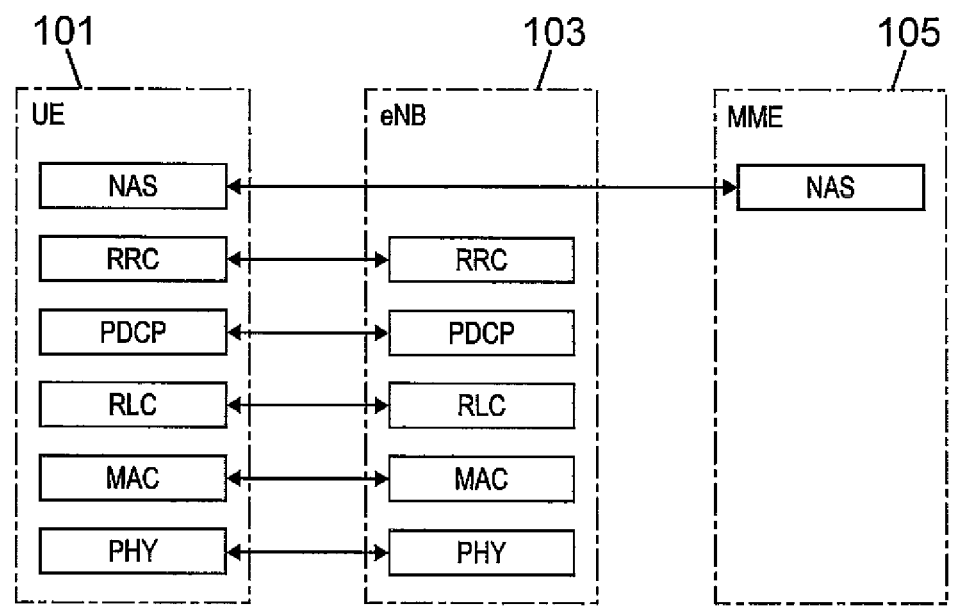
Figure 3:
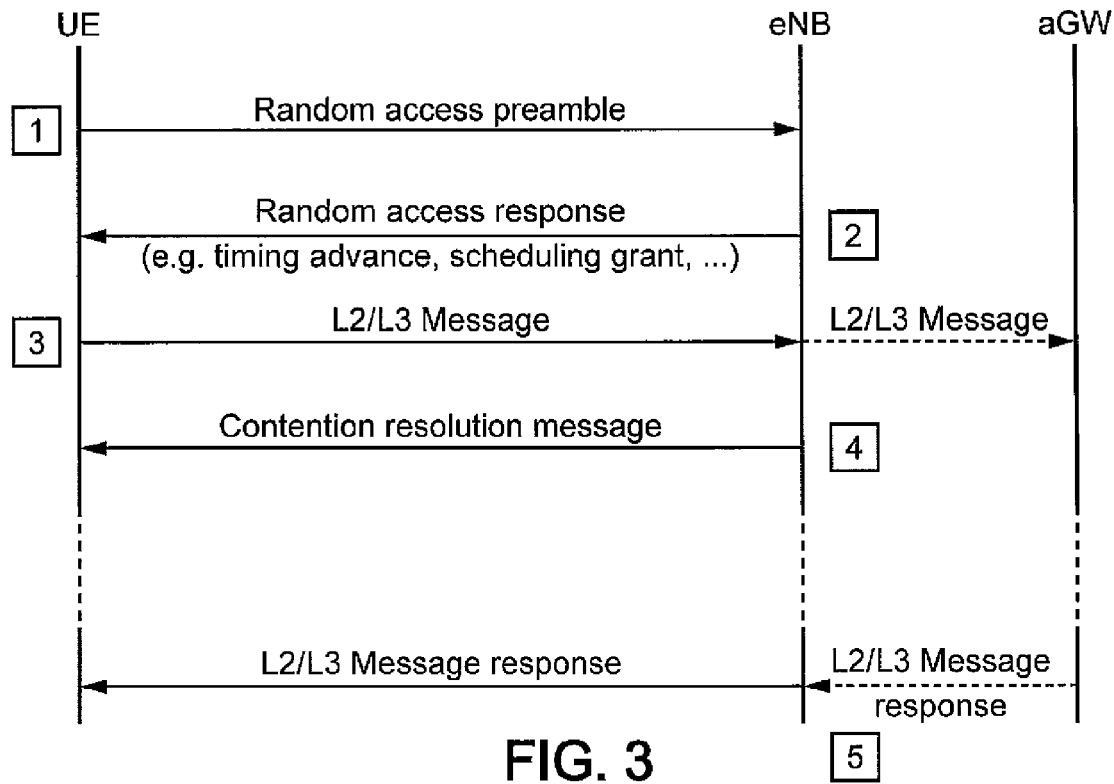
Figure 4:
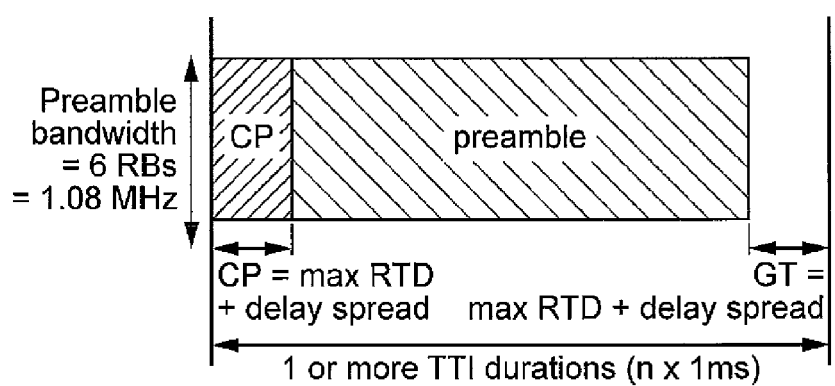
FIG. 4 is a diagram illustrating a typical RACH procedure.

Since in a conventional RACH procedure collision detection does not occur until after message 4 of FIG. 3, keeping the same signature for retransmitted preambles from UE 101 does not increase the probability of collision. If earlier contention resolution is implemented, a NACK random access response can be sent in the random access response of step S109 from eNode 103, i.e. in message 2 of FIG. 3 to indicate collision with another UE. On receiving such a NACK response from eNodeB 103, the UE 101 will change the preamble signature to a different signature in order to avoid collision and send a preamble having the different signature to the eNodeB 103.

A second embodiment of the invention is illustrated in FIGS. 7A and 7B. In the second embodiment of the invention, a preamble signal transmitted by UE 101 in step S201 identical to step S101 of the first embodiment, undergoes, on reception at eNodeB 103, steps S202 to S204 of demodulation, CP removal, DFT processing, demapping, correlation and IDFT processing, identical to steps S102 to S104 of the first embodiment. The second embodiment differs to the first embodiment of the invention in that the power level of the received preamble signal is compared with a successful detection level in step S206 prior to being added to the contents of memory 28. If the power level of the received preamble signal falls below the successful threshold level and exceeds the combining threshold level, the preamble signal then added to the memory contents in step S210a. The preamble signal is added to one or more stored preamble signals having the same signature as the received preamble signal to form a combined signal. In step S210b the combined preamble signal is retrieved from the memory 28 and compared with the successful detection threshold level. The method then proceeds in a similar manner to the first embodiment.

A third embodiment of the invention is illustrated in FIGS. 8A and 8B. In the third embodiment of the invention a preamble signal transmitted by UE 101 in step S301 identical to step S101 of the first embodiment, undergoes steps S302 and S303 of demodulation, CP removal, DFT processing, and demapping, identical to steps S102 and S103 of the first embodiment, on reception at eNodeB 103. The third embodiment of the invention differs to the first embodiment of the invention in that the preamble signals are added to the contents of the memory 38 in step S304 prior to signature correlation and IDFT processing in step S305. If the received preamble signal is unsuccessfully detected, i.e. falls below the successful detection threshold level, in step S306 a combined preamble signal constituted of one or more preamble signals having the same preamble signature undergoes the steps of signature correlation and IDFT processing in step S305 before being compared with the successful detection threshold level in S306. The method then proceeds in a similar manner to the first embodiment.

In alternative embodiments of the invention, preamble signals may be individually stored in a memory and then combined with one or more preamble signals having the same signature after an unsuccessful detection occurs.

It will be appreciated that the methods of the invention may be used as an alternative to frequency hopping as a method of increasing the probability of preamble detection, or in combination with frequency hopping to increase the probability of preamble detection and improve RACH performance.

While embodiments of the present invention has been hereinbefore described in relation to the illustrative case of a 3GPP LTE system, those skilled in the wireless communication art will appreciate that the invention is applicable to communications systems other than 3GPP LTE systems.

Many further modifications and variations will suggest themselves to those versed in the art upon making reference to the foregoing illustrative embodiments, which are given by way of example only and which are not intended to limit the scope of the invention, that being determined solely by the appended claims.

The invention claimed is:

1. A network entity for processing a random access preamble, the network entity comprising:
    a transceiver;
    a memory; and
    a processor configured to:
        control the transceiver to receive a first random access preamble including a signature,
        determine that a power level of the first random access preamble does not exceed a successful detection threshold level but exceeds a lower combining acceptance threshold level,
        combine the first random access preamble with a previous random access preamble which is stored in the memory and has a same signature as the first random access preamble to form a combined random access preamble when the power level of the first random access preamble does not exceed the successful detection threshold level but exceeds the lower combining acceptance threshold level,
        determine that the combined random access preamble does not exceed the successful detection threshold level, and
        control the transceiver to receive a second random access preamble including the same signature when the power level of the combined random access preamble does not exceed the successful detection threshold level,
    wherein the second random access preamble is received when a random access response for the random access preamble is not transmitted by the network entity, wherein the second random access preamble is received at an increased power level than the power level of the first random access preamble, wherein the processor is configured to store the first random access preamble with the previous random access preamble prior to determining whether the power level of the first random access preamble exceeds the successful detection threshold level and whether the power level of the first random access preamble exceeds the lower combining acceptance threshold level, and flush the memory in response to a predetermined number of successive random access preamble signals that include the same signature having been successfully received but not successfully detected.

2. The network entity according to claim 1, wherein the processor is configured to control an execution of a random access procedure based on the combined random access preamble if the power level of the combined random access preamble exceeds the successful detection threshold.

3. A method of processing a random access preamble in a network entity, the method performed by the network entity and comprising:

receiving a first random access preamble including a signature from a User Equipment;

storing the first random access preamble;

determining that a power level of the first random access preamble does not exceed a successful detection threshold level but exceeds a lower combining acceptance threshold level;

combining the first random access preamble with a previous random access preamble which is stored in a memory and has a same signature as the first random access preamble to form a combined random access preamble when the power level of the first random access preamble does not exceed the successful detection threshold level but exceeds the lower combining acceptance threshold level;

determining that the combined random access preamble does not exceed the successful detection threshold level; and receiving a second random access preamble including the same signature when the power level of the combined random access preamble does not exceed the successful detection threshold level, wherein the second random access preamble is received in case that a random access response for the random access preamble is not transmitted by the network entity, wherein the second random access preamble is received at an increased power level than the power level of the first random access preamble, wherein the first random access preamble is stored with the previous random access preamble prior to determining whether the power level of the first random access preamble exceeds the successful detection threshold level and whether the power level of the first random access preamble exceeds the lower combining acceptance threshold level; and flushing a memory in response to a predetermined number of successive random access preamble signals that include the same signature having been successfully received but not successfully detected.

4. The method according to claim 3, further comprising:

executing a random access procedure based on the combined random access preamble if the power level of the combined random access preamble exceeds the successful detection threshold.

5. The method according to claim 3, wherein the step of storing the first random access preamble comprises:

storing the first random access preamble with the previous random access preamble prior to determining whether the power level of the first random access preamble exceeds the successful detection threshold level and whether the power level of the first random access preamble exceeds the lower combining acceptance threshold level.

6. The method according to claim 3, wherein a power level of the previous random access preamble does not exceed the successful detection threshold level.

* * * * *